Jan. 1, 1929.
L. O. MARTIN
1,697,198
AUTOMOBILE CONSTRUCTION
Filed Aug. 24, 1927
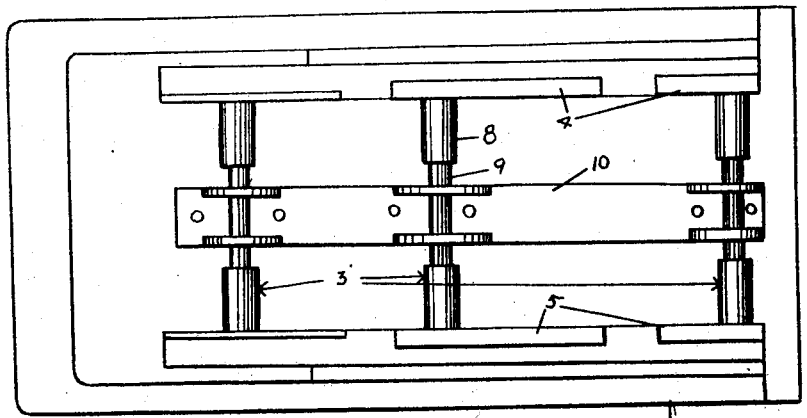
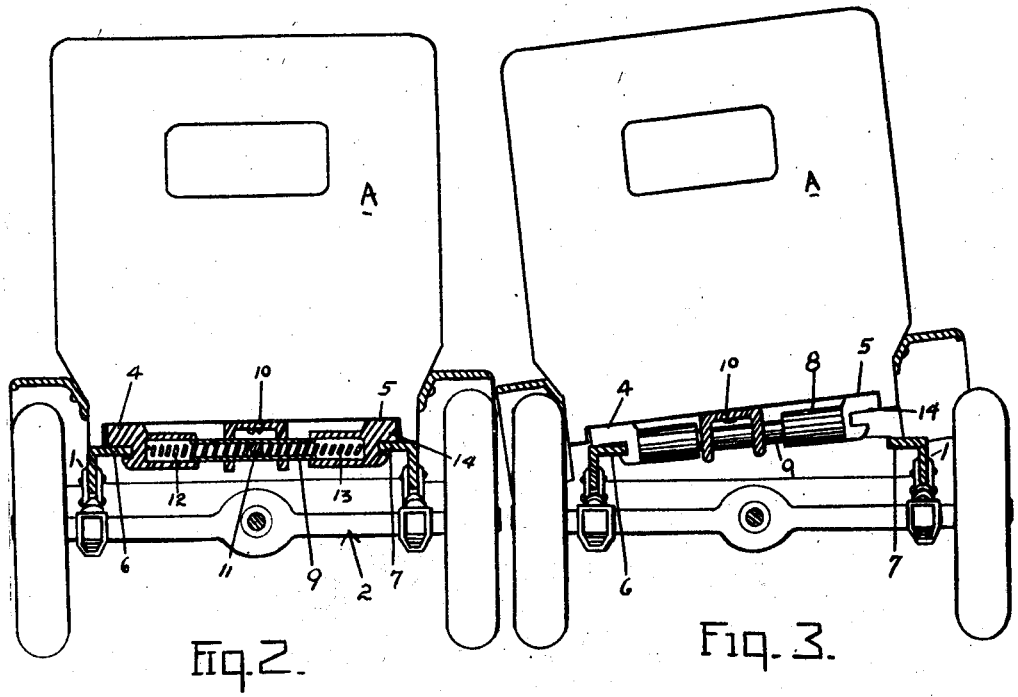
INVENTOR
L.O. MARTIN
BY
ATTORNEY Patented Jan. 1, 1929.

1,697,198

UNITED STATES PATENT OFFICE.

LEWIS O. MARTIN, OF SAN FRANCISCO, CALIFORNIA, ASSIGNOR OF ONE-HALF TO JOSEPH H. FERRIS, OF SAN FRANCISCO, CALIFORNIA.

AUTOMOBILE CONSTRUCTION.

Application filed August 24, 1927. Serial No. 215,138.

This invention relates to improvements in automobile body constructions and resides in the provision of a novel means for fastening an automobile body to the frame or chassis therefor, which means operates incident to side pressure being applied to the body as in turning over of the automobile and in a case of collision thereof, to release said holding means thereby permitting the body to become detached from the chassis and to roll or fall off of the chassis so that it will be separated from the chassis and other parts of the automobile to prevent injury to the occupants of the body, particularly due to fire and to the crushing of the body, due to the weight of the chassis and engine.

Another object of the invention is to provide a means of the character described whereby the installation of the body on the chassis and its removal, may be more easily and quickly effected than is possible with automobiles in which the body and chassis are bolted, riveted or otherwise secured together.

A further object of the invention is to provide a means of the character described for releasing the body from the chassis, which means will not act automatically incident to pressures occurring due to the swaying of the body relative to the chassis, the said means requiring a direct pressure due to contact with some other object, which pressure must be applied laterally to either side of the body in order to release the body from the chassis.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a bottom plan view of the device of my invention generally applied to an automobile body, the body being removed from the chassis of the automobile.

Fig. 2 represents a cross sectional view taken through the chassis of an automobile showing the body and the device of my invention in section, with the body held on the chassis by the means of the invention, the said body being shown in rear elevation.

Fig. 3 is a view similar to Fig. 2, showing the body when pressure is applied to one side thereof.

The embodiment of the invention shown in the accompanying drawing comprises an automobile chassis generally designated 1, having the usual running gear 2 and containing the engine and control elements of the automobile, not shown.

Attached to the body A is a means generally designated 3 which securely holds the body in proper position on the chassis and which yields incident to direct lateral pressure being applied to either side of the body, and on such yielding releases the body from the chassis so that it will roll off of the chassis or may be lifted off as desired. The body is constructed so that its sole means of connection with the chassis is through the means 3. This means comprises in the present instance three identical units arranged at spaced points along the under side of the body. Each of these units comprises U-shaped clamps 4 and 5 arranged to engage with angle iron sides 6 and 7 of the chassis. The lower sides of the U-shaped clamps are shorter than the upper sides and the horizontal portions of the angle bars 6 extend into the grooves provided in the U-shaped clamps. These clamps are elongated being several feet long preferably, although other dimensions may be followed as desired.

On the backs of the clamps are tubular projections 8 which receive the ends of a connecting tube 9. This tube 9 is rigidly fastened in any suitable manner to a channel iron piece 10, in turn rigidly secured to the bottom of the body. In the center of the tube 9 is a fixed stop member 11 against which are engaged certain ends of springs 12 and 13. These springs engage the backs of the clamping members 4 and 5 respectively and urge said clamping means outward into clamping and holding engagement with the said members 6 and 7 of the chassis. By providing several elongated clamps on the under side of the body at properly spaced points, provision is made for securely holding the body upon the chassis in such manner that when a direct lateral pressure is applied against either side of the body, the clamping means will yield and be disengaged on one side from the side members of the chassis.

As shown in Fig. 3, pressure has been applied to the right side of the body and said body has been pushed over to the left due to the yielding of the springs sufficiently to disengage the clamping member 5 from the angle iron piece 7. Thus it will be seen that an automobile constructed in accordance with this invention when overturning or when colliding forcibly with another automobile or other object, in either instance in such manner that a direct lateral pressure is applied against either side of the body, will cause the body to be detached from the chassis and roll off to one side so as to prevent crushing of the body beneath the chassis and engine.

The arrangement is such that the swaying of the body occasioned in turning corners will not set up sufficient side movement to release the clamping means. Due to the fact that the clamp engages with the chassis for a distance substantially equal to the length of the body, and to the general flexibility provided by having the spring urged device located at points near the ends and near the center of the body, when the centrifugal action operates to cause a side sway of the body, as when turning a curve sharply or when swerving to one side of the road at high speed, the clamping means does not release on either side. This is because the centrifugal action is greater toward the rear of the vehicle than towards the front and therefore the side pressure tends to sway the rear end around in one direction and the front end in the other. This results in a pressure being applied diagonally across from one end of the body to the other and one end of the clamp will bind tight with the body, whereas the other end will tend to release from the body, and the other clamp will bind at one end and release at the other, thus, however, providing two points of engagement of the clamp, one on each side of the body and thereby preventing a release of the clamp on one or the other sides. The body in tending to sway to the right or left, acts as though it were mounted on a pivot point, and thereby, for example, if it tends to swing the rear end to the right, it will likewise move the front end to the left and although the other two corners or ends would be in a position to release the clamp, the first named corners would remain tightly clamped to the chassis. This arrangement provides for a quick setting up of the body on and the connecting thereof to the chassis and for a quick removal of the body also, it being unnecessary to remove fastening elements as is now the practice. The repair of the automobile may be facilitated by the provision for quick and easy removal of the body.

Along the bottom of the body on each side is a downwardly projecting portion or flange 14 which rests upon the upper sides of the chassis members 6 and 7 thereby relieving the clamps of the weight of the body. When a side pressure is applied to the body on either side, these projecting portions which extend substantially the full length of the body, will engage the clamps and through such engagement tend to move certain of the clamping members out of holding relation to the chassis.

I claim:

1. The combination with an automobile including a chassis and a body detachably mounted on the chassis, of means of connection between the body and chassis which means will operate incident to lateral pressure directly applied on either side of the body due by engagement of the body with an object to release the body from the chassis.

2. The combination with an automobile including a chassis and a body detachably mounted on the chassis, of means of connection between the body and chassis operating only incident to lateral pressure on either side of the body by actual engagement of the body with an object to release the body from the chassis, which means includes spring urged clamping elements slidably mounted on the under side of the body and being engaged with the chassis over a distance substantially equal to the length of the body.

3. The combination with an automobile including a chassis and a body which is detachable from the chassis, of clamping means slidably mounted on the under side of the body and engaging the chassis to releasably hold the body on the chassis and spring means normally urging said clamping means into clamping position and which yields incident to direct side pressure against either side of the body, said clamping means being arranged whereby when the body accidentally encounters an obect on either side thereof, said clamping means will automatically release the body.

LEWIS O. MARTIN.